United States Patent [19]
Lim

[11] Patent Number: 5,509,980
[45] Date of Patent: Apr. 23, 1996

[54] CYCLIC OVERAGEING HEAT TREATMENT FOR DUCTILITY AND WELDABILITY IMPROVEMENT OF NICKEL-BASED SUPERALLOYS

[75] Inventor: Leong-Chew Lim, Singapore, Singapore

[73] Assignee: National University of Singapore, Singapore, Singapore

[21] Appl. No.: 291,823

[22] Filed: Aug. 17, 1994

[51] Int. Cl.$^6$ .................................................. C22F 1/10
[52] U.S. Cl. .................... 148/524; 148/525; 148/526; 148/527; 148/555; 148/556; 148/675; 148/677; 219/121.14; 219/121.46; 219/121.64
[58] Field of Search .................................. 148/524, 525, 148/526, 527, 675, 677, 555, 556; 228/675, 203, 232, 262.3; 219/121.46, 121.64, 121.14

[56] References Cited

U.S. PATENT DOCUMENTS 4,731,131  3/1988  Sakata et al. ........................ 148/526
4,973,366  11/1990  Yasuda et al. ....................... 148/527
5,302,217  4/1994  Gostic et al. ........................ 148/675

OTHER PUBLICATIONS

"Practical Solutions to Strain–Age Cracking of René 41" by E. G. Thompson et al., pp. 229–313 Jul. 1968 *Welding Research Supplement*.

Primary Examiner—David A. Simmons
Assistant Examiner—Margery S. Phipps
Attorney, Agent, or Firm—Birch, Stewart, Kolasch & Birch

[57] ABSTRACT

The present invention is directed to a pre-weld overageing heat treatment for nickel-based superalloys, where the alloy is heated to solutionization temperature for a time sufficient to dissolve the gamma prime phase of the alloy microstructure, then slowly cooled with periods of intermittent heating, so that the gamma prime phase reprecipitates as coarse equiaxed particles, and the presence of fine sized gamma prime phase particles is substantially avoided. The present invention is also directed to a welding method wherein said pre-weld overageing treatment is used.

16 Claims, 4 Drawing Sheets

CYCLIC OVERAGEING HEAT TREATMENT FOR DUCTILITY AND WELDABILITY IMPROVEMENT OF NICKEL-BASED SUPERALLOYS

BACKGROUND OF THE INVENTION

1. Field of the Invention

This invention relates to a new overageing heat treatment for ductility and weldability improvement of nickel-based superalloys, by means of cyclic overageing techniques. The process of the present invention is applicable to alloys for use in applications where a high material ductility is beneficial, such as in aerospace refurbishment, in applications requiring the improvement of formability in subsequent cold forming and sizing of the alloy, and in applications requiring the improvement of machinability in subsequent machining, cutting, grinding, etc. of the alloy.

2. Description of the Related Art

Repair of aero-engine hot-section components made of nickel-based superalloys are often carried out by welding. These superalloys, especially those advanced grades containing relatively high contents of the strengthening gamma prime phase, are susceptible to cracking during the post-weld heat treatment to regenerate the desired microstructure-dependent properties. As a result, these superalloys are considered to be difficult-to-weld materials. One way to improve the weldability of this group of superalloys is to subject the materials to a pre-weld overageing treatment. This increases the material ductility which, in turn, helps to limit the build-up of residual stress produced by welding, and reduces the susceptibility to post-weld heat treatment (PWHT) cracking of the material.

Conventional pre-weld overageing treatments, such as those currently being used by aero-engine component refurbishment industries, involve heating the material to the solutionizing temperature to dissolve the strengthening gamma prime phase, followed by simple, slow cooling to allow the gamma prime phase to reprecipitate out as coarse particles.

The above overageing scheme involving simple cooling has been found to be effective in improving the weldability of certain nickel-based superalloys, such as Rene 41, as indicated by E. G. Thompson, S. Nunez and M. Prager, 47 Welding Journal 229 (1968). However, this scheme is not very effective for difficult-to-weld, advanced nickel-based superalloys, such as Rene 80. Although blade tip mass build-up by fusion welding has been an acceptable practice in the repair of turbine blades made of Rene 80 nickel-based superalloy, a sizeable rejection rate has often been reported. Furthermore, attempts to repair thermal fatigue cracks at the tip of Rene 80 turbine blades by welding remain unsuccessful to date.

SUMMARY OF THE INVENTION

It is an object of the present invention to provide an overageing heat treatment that will improve the ductility and weldability of difficult-to-weld, advanced nickel-based superalloys, without the sizeable rejection rate associated with blade tip mass build-up by fusion welding.

It is a further object of the present invention to provide such an overageing heat treatment by ensuring that the content of coarse equiaxed gamma prime precipitates in the microstructure is maximized or predominates, as compared to microstructures produced by conventional overageing treatments. In other words, it is an object of the present invention to provide an overageing heat treatment that produces a microstructure having a narrower dispersion of gamma prime precipitate sizes than is obtainable from conventional overageing treatments.

It is a further object of the present invention to provide this more uniform microstructure by providing a driving force for the dissolution of newly nucleated, small gamma prime nuclei which precipitate during the cooling stage.

It is a further object of the present invention to provide a welding process including said overageing heat treatment, whereby the build-up of residual stress produced by welding, and the susceptibility of the welded material to post-weld heat treatment (PWHT) cracking, are reduced.

These and other objects and advantages of the present invention are obtained by providing a pre-weld overageing heat treatment process comprising (a) heating a nickel-based superalloy in need of such treatment to solutionization temperatures for a period of time sufficient to dissolve a strengthening gamma prime phase of the microstructure of said nickel-based superalloy (the solutionization step); (b) cooling said heated nickel-based superalloy at a rate of cooling that is slow enough to allow reprecipitation of said gamma prime phase as coarse particles (the slow cooling step); and (c) intermittently heating said slowly cooling heated nickel based superalloy at a rate or rates, and for a duration or durations, sufficient to obtain predominantly substantially uniform coarse equiaxed gamma prime precipitates in said microstructure.

The objects and advantages of the present invention can also be obtained when the pre-weld overageing heat treatment process further comprises discontinuing said intermittent heating when the temperature of the slowly cooling nickel-based superalloy drops below about 500° C., and wherein further slow cooling is conducted until the temperature reaches about room temperature. Said further slow cooling may be conducted by furnace cooling.

The objects and advantages of the invention are also achieved by providing a method for welding a nickel-based superalloy comprising (a) subjecting the nickel-based superalloy to be welded to the pre-weld overageing heat treatment process described above, and (b) welding the treated nickel-based superalloy obtained in (a) using conventional methods for welding said alloy, but obtaining improved reduction in the build-up of residual stress produced by welding, and improved reduction in the susceptibility of the alloy to post-weld heat treatment cracking. These conventional welding treatments include mass build-up, gouge-and-weld repair of thermal fatigue cracks, or any welding process where localized heating beyond the solutionizing temperature of the alloy occurs, especially when high residual stresses are generated in the process. Further examples include fusion welding processes, such as TIG, plasma arc, laser welding, etc.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by way of illustration only, and thus are not limitative of the present invention, and wherein.

DETAILED DESCRIPTION OF THE INVENTION

The process of the present invention is applicable to a range of nickel-based superalloys containing high volume fractions of gamma prime phase, i.e., high aluminum or titanium containing nickel-based superalloys. These alloys are generally known as "difficult-to-weld" materials, because they suffer from post-weld heat treatment cracking.

The temperatures and times to be used with the solutionizing step of the claimed process are not particularly limited, and will vary depending on the particular type of nickel alloy used. This is also true for the cooling rate and cooling time for the cooling step. In general, this information is known to those skilled in the art, and is available from aerospace materials specifications for the particular alloy. Preferred are cooling rates that are not so slow that heat treatment will continue over several days, for economic reasons.

Figure 1:
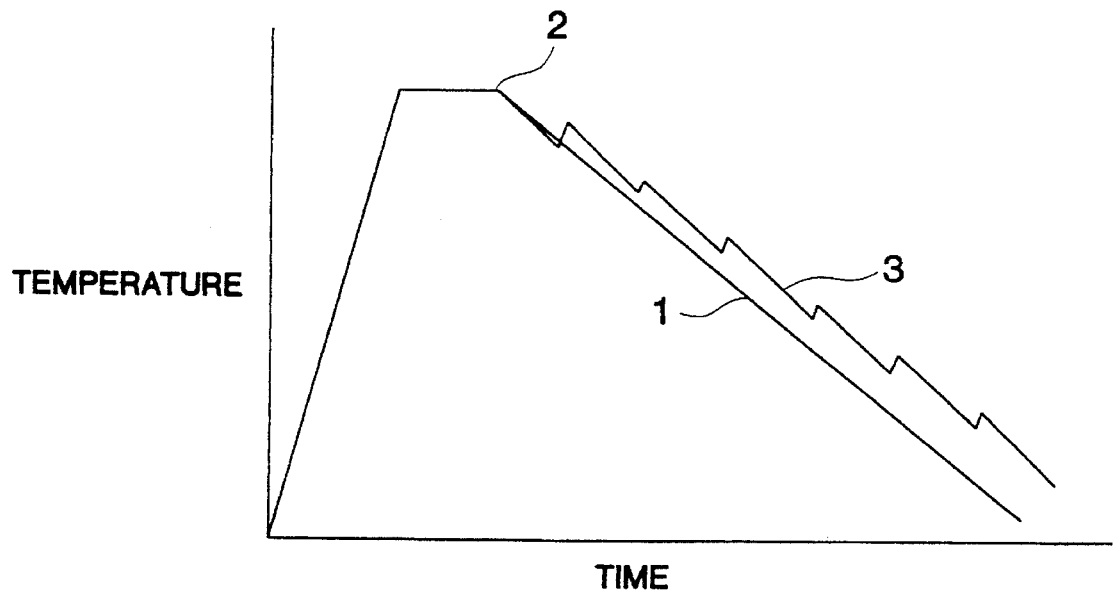
FIG. 1 shows schematically the conventional slow-cooling overageing heat treatment, and the cyclic or intermittent heating overageing heat treatment of the present invention. Temperature is shown on the ordinate, and time is shown on the abscissa.

As shown schematically in FIG. 1, instead of the simple cooling used in conventional step overageing heat treatments, shown by the curve designated 1, in the present invention, the cooling of the heat treatment after solutionizing, 2, comprises cyclic intermittent heatings as shown by the curve designated 3.

The intermittent heating cycles during cooling are the unique features of the present invention which serve the function of providing a driving force for the dissolution of gamma prime precipitates formed during the slow cooling stage, especially for the dissolution of newly nucleated, small gamma prime nuclei, which are unstable due to their large interfacial area to volume ratio. The intermittent heatings thus help to limit the number of gamma prime nuclei during the pre-weld overageing treatment to ensure that the resultant microstructure contains predominantly coarse equiaxed gamma prime precipitates. This compares favorably with the microstructure produced by the conventional overageing treatments, where gamma prime precipitates of different-sizes are often present, including gamma prime precipitates of a small size.

Figure 4A:
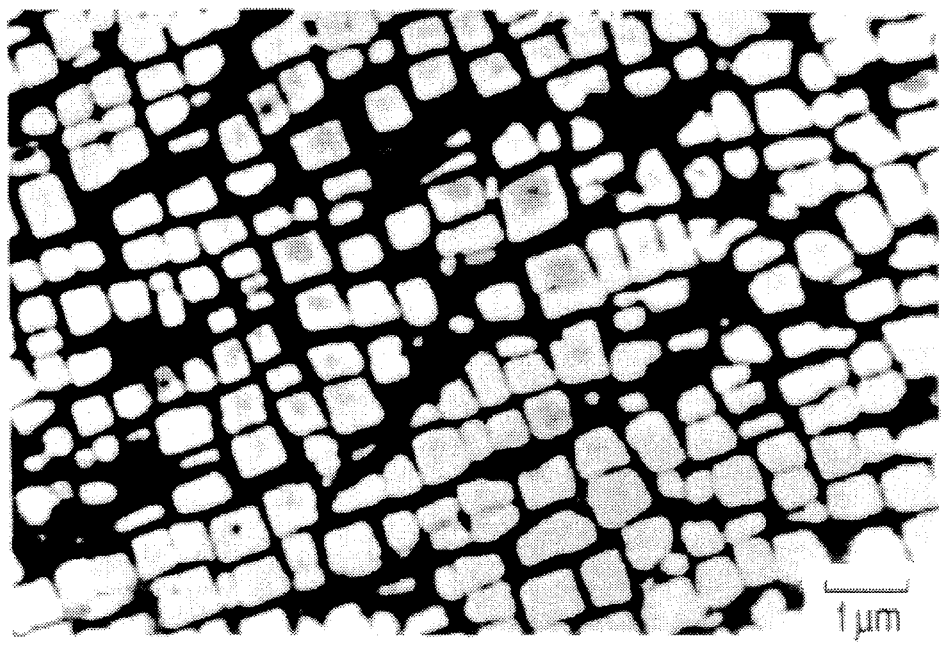
FIG. 4(a) shows the microstructure for Rene 80 nickel-based superalloy after the cyclic or intermittent heating overageing heat treatment of the present invention, wherein dT/dt=4.3° C./min and $t_d$= 5 min.
Figure 4B:
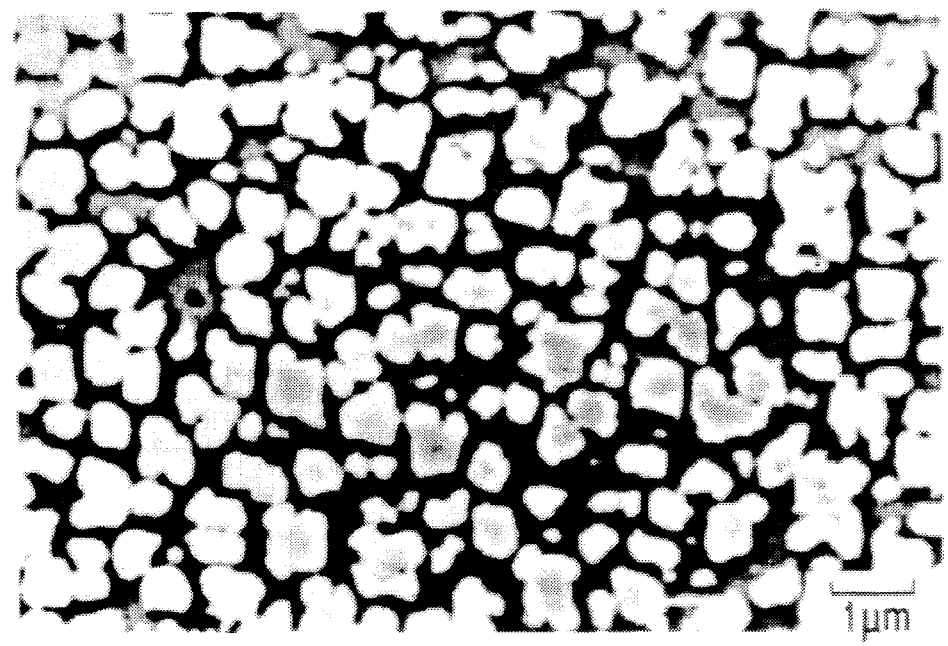
FIG. 4(b) shows the microstructure for Rene 80 nickel-based superalloy after conventional overageing heat treatment. The nominal cooling rate in each case was 0.5° C./min.

Examples of a gamma prime phase that can be characterized as "coarse" are shown in FIG. 4. Gamma prime phase that can be considered "fine" are at least an order of magnitude smaller than the "coarse" gamma prime phase, and are often submicroscopic. The decrease in fine gamma prime phase can be inferred from the resultant mechanical properties of the material.

The intermittent heating rate and duration may vary, depending upon the particular application to which the nickel-based superalloy will be put, but generally each period of intermittent heating will involve heating the cooling nickel-based superalloy at a rate of about 3° to 6° C./min for a duration of about 2 to 20 minutes.

The frequency of the intermittent heatings also may vary, depending upon the application. In general, this frequency should be chosen to make the overall heat treatment time comparable to that of conventional overageing heat treatments. However, for improving ductility and weldability of nickel-based superalloys like Rene 80, a heating occurring about every 100° C. of temperature decrement is desirable. The intermittent heating may be discontinued when the temperature of the nickel-based superalloy drops below about 500° C. Further cooling of the alloy to near room temperature may then be conducted, either in a furnace, or at a sufficiently low rate of cooling that a substantial number of small gamma prime phase nuclei do not form.

Figure 2:
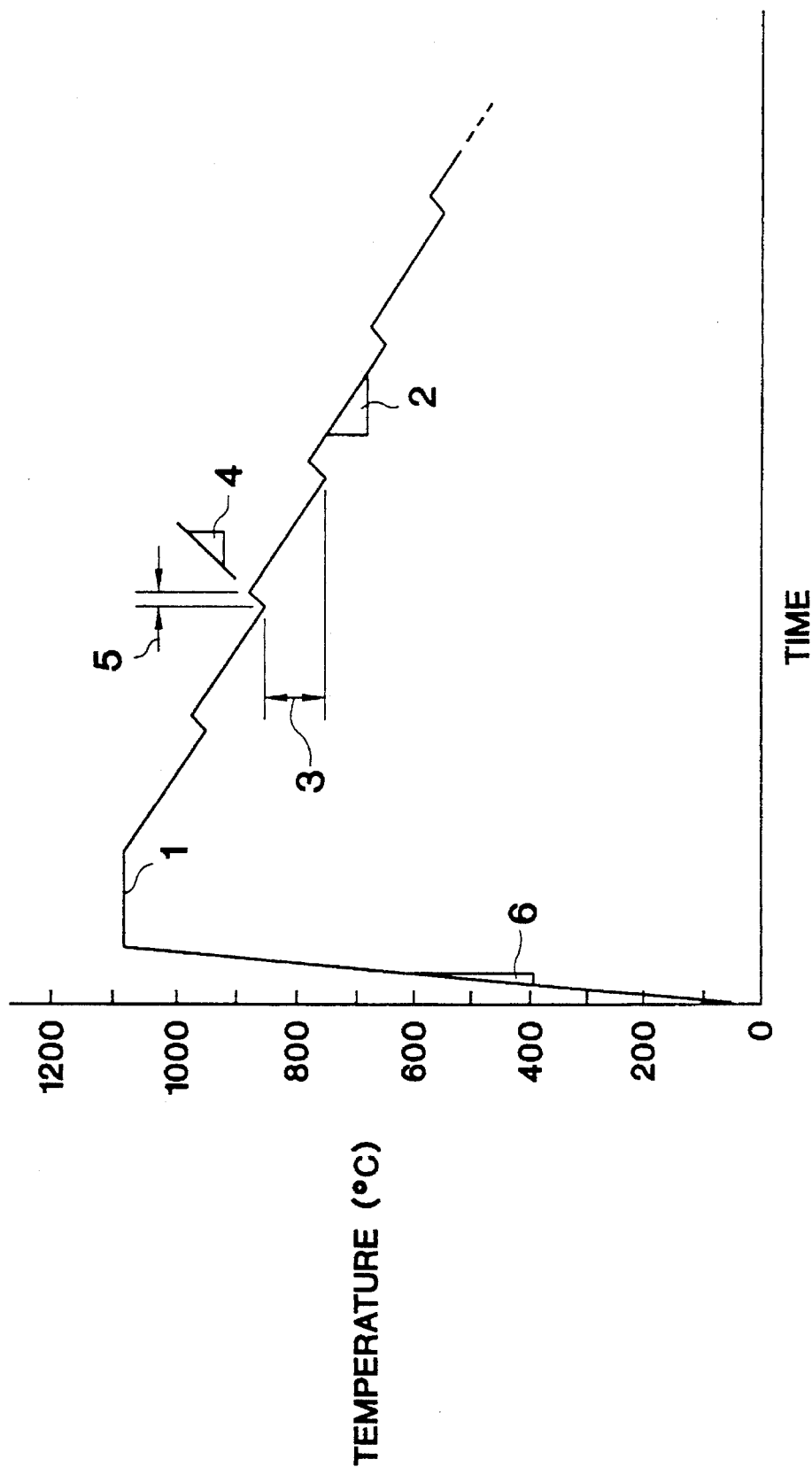
FIG. 2 shows schematically the cyclic or intermittent heating overageing heat treatment for Rene 80 nickel-based superalloy detailed in the Example. Temperature is shown on the ordinate, and time is shown on the abscissa.

The following Example illustrates the effectiveness of the proposed cyclic overageing heat treatment scheme for improving the ductility and weldability of Rene 80, a difficult-to-weld nickel-based superalloy commonly used for first and second stage turbine blades in both commercial and military jet engines. The example is divided into two parts as follows:

Part I shows the effect of the cyclic overageing heat treatment on the room temperature tensile ductility, measured in terms of reduction in area (RA), of the material. FIG. 2 shows the details of the heat treatment cycle used. First, after heating at 35° C./min, 6, the material was solutionized at 1080° C. for 30 minutes, shown by a horizontal line 1. It was then cooled at a rate of 0.5° C./min, 2, incorporating an intermittent heating step for every 100° C. decrease in temperature, 3. The 100° C. interval was chosen to make the overall heat treatment time comparable to that of conventional overageing heat treatments. The intermittent heating rate (dT/dt), 4, and duration ($t_d$), 5, were varied, in order to determine the optimum intermittent heating parameters for maximum material ductility.

Figure 3:
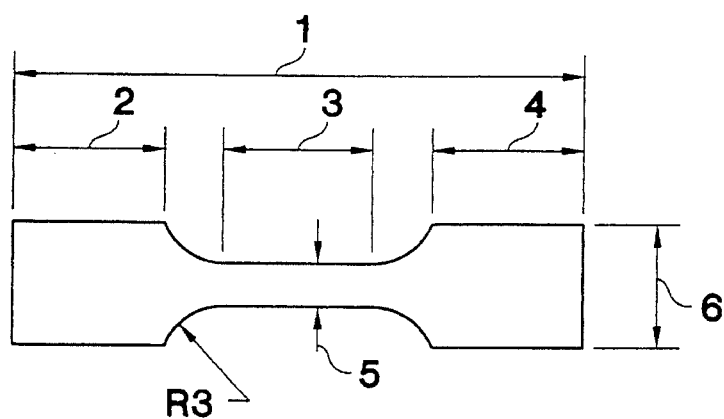
FIG. 3 shows the dimensions of the tensile specimens tested in the Example.

The tensile specimens, the dimensions of which are shown in FIG. 3, were machined from the firtree region of used Rene 80 turbine blades by means of wire electro-discharge machining (EDM). The overall length of the specimen, 1, is 27 mm. The length of each intermediate section, designated as 2, 3, and 4, is 7 mm. The width of the narrow portion, 5, is 2 mm, and the width of the wide portion, 6, is 5 mm. The specimen was 0.5 mm thick. After machining, about 0.1 mm of material was ground from each side of the specimen surfaces to remove the recast layer produced by EDM. Then the specimens were given the cyclic overageing heat treatment in a high-vacuum furnace with different intermittent heating rates (dT/dt) and durations ($t_d$). After the heat treatments, the specimens were pulled to fracture at room temperature at a nominal strain rate of $2.38 \times 10^{-4} s^{-1}$.

The results of the tests are shown in Tables 1 and 2. The results show that the cyclic overageing treatment is effective in improving the tensile ductility of the material over a range of dT/dt and $t_d$ values. Under optimum conditions, a tensile ductility of more than 20% RA has been consistently obtained. This compares favorably with the value of less than 15% RA achievable by the conventional simple-cooling overageing treatment (Table 3).

TABLE 1

Effect of intermittent heating rate with temperature increment fixed at 30° C.

| Heating duration $t_d$ (min) | Corresponding heating rate dT/dt (°C./min) | No. of specimens tested | R.A. values registered (%) | Average R.A. (%) |
|---|---|---|---|---|
| 3 | 10.0 | 3 | 10.9; 11.3; 16.3 | 12.8 |
| 5 | 6.0 | 3 | 17.9; 19.4; 20.7 | 19.3 |
| 7 | 4.3 | 8 | 17.6; 20.5; 20.8; 20.8; 22.5; 22.6; 26.0; 31.1 | 22.7 |
| 10 | 3.0 | 3 | 12.4; 17.6; 19.1 | 16.4 |
| 15 | 2.0 | 3 | 10.6; 13.4; 16.9 | 13.6 |

TABLE 2

Effect of intermittent heating duration with heating rate (dT/dt) fixed at 4.3° C./min

| Heating duration $t_d$ (min) | No. of specimens tested | R.A. values registered (%) | Average R.A. (%) |
|---|---|---|---|
| 3 | 4 | 15.8; 18.6; 19.4; 20.3 | 18.5 |
| 5 | 3 | 19.1; 20.1; 22.8 | 20.7 |
| 7 | 8 | 17.6; 20.5; 20.8; 20.8; 22.5; 22.6; 26.0; 31.1 | 22.7 |
| 11 | 4 | 18.2; 19.3; 22.0; 23.9 | 20.9 |
| 14 | 8 | 18.8; 20.8; 21.1; 21.6 22.2; 22.9; 23.9; 25.7 | 22.1 |
| 18 | 4 | 16.3; 22.8; 23.4; 24.8 | 21.8 |
| 21 | 4 | 12.7; 13.8; 15.8; 16.5 | 14.7 |

TABLE 3

Effect of conventional overageing heat treatment with a cooling rate of 0.5° C./min

| No. of specimens tested | R.A. values registered (%) | Average R.A. (%) |
|---|---|---|
| 2 | 12.8; 14.9 | 13.9 |

FIG. 4(a) and (b) compare the microstructures produced by the new, cyclic overageing and the conventional overageing heat treatments, respectively. Comparison of these figures shows the relatively equiaxed, coarse gamma prime precipitates and the absence of fine gamma prime precipitates in the specimen subjected to the cyclic overageing heat treatment of the present invention.

From the results of both the tensile tests and metallographic examinations, the optimum intermittent heating parameters for the cyclic overageing treatment are given below:

Optimum intermittent heating rate (dT/dt): 3° to 6° C./min.

Optimum intermittent heating duration ($t_d$): 2 to 20 mins.

It was also found that the effect of intermittent heating diminishes for cooling below 500° C. While not wishing to be bound by any theory, it is believed that this effect is due to the fact that below this temperature, most of the gamma prime phase would have precipitated out. Therefore, intermittent heatings may be stopped at 500° C. and below for economic purposes.

Part II demonstrates the weldability of Rene 80 using turbine blades retrieved from service. Two types of weld repairs were conducted: (1) mass build-up at the blade tip with up to 5 weld passes, and (2) the repair of thermal fatigue cracks at the blade tip by a gouge-and-weld technique. For the latter, two gouged area sizes were investigated: 0.1"×0.15" and 0.15"× 0.25".

After stripping the blades of coatings, the blades were given the proposed cyclic overageing heat treatment with dT/dt=4.3° C./min and $t_d$=7 minutes. They were then welded manually by means of TIG welding with IN625 filler using standard welding parameters. After welding, the blades were checked by means of fluorescent penetrant-inspection (FPI) to ensure that they were free of welding induced defects or cracks. The blades were then given the standard post-weld heat treatment and again checked for cracks by FPI. The results of the study are given below:

a) For mass build-up at the blade tip, a 100% success rate was recorded for 1 weld pass and 3 weld passes (out of 12 and 15 blades respectively). The success rate for 5 weld passes was 93.3%, with 1 out of 15 blades containing PWHT cracks.

b) For weld repair of thermal fatigue cracks at the blade tip, a 100% success rate was obtained for the 15 blades with a smaller gouged area of 0.1"×0.15", while 2 out of 7 blades with a larger gouged area of 0.15"×0.25" contained PWHT cracks, giving a success rate of 71.4%.

Figure 5:
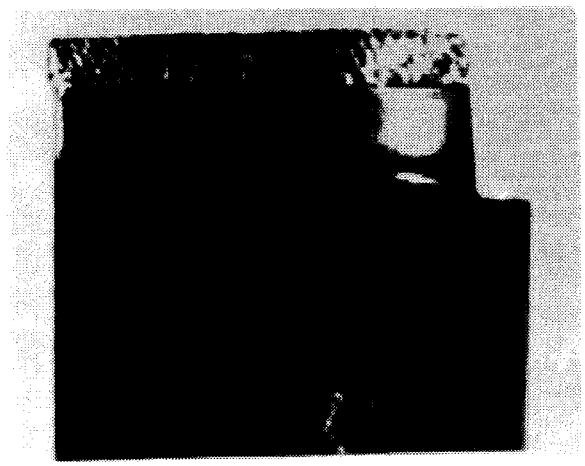
FIG. 5 shows the heavy mass build-up obtained with 5 weld passes.
Figure 6:
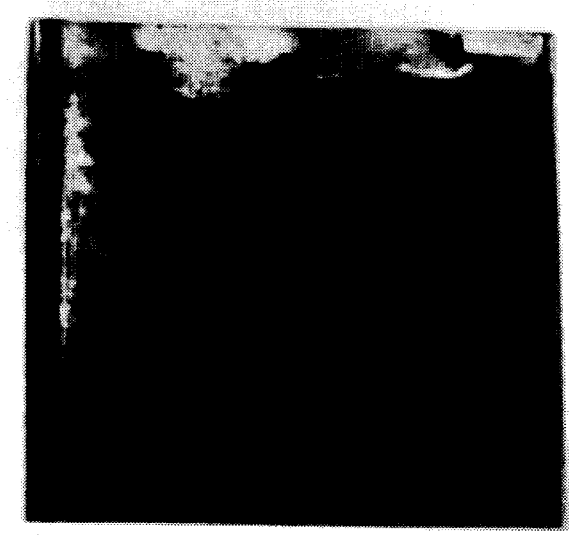
FIG. 6 shows the gouge-and-weld patch of a blade tip region formerly containing a thermal fatigue-crack.

FIG. 4 shows the heavy mass build-up with 5 weld passes, while FIG. 5 shows the gouge-and-weld patch of a blade tip region formerly containing a thermal fatigue crack.

Considering that with the currently available pre-weld heat treatments, fairly high rejection rates of up to 20% or higher are often encountered in the weld repair of Rene 80 blade tips by mass build-up (of up to 2 weld passes), and that the weld repair of thermal fatigue cracks at Rene 80 blade tips remains unsuccessful to date, due to the susceptibility of the material to PWHT cracking, the weldability improvement achieved by the present cyclic overageing heat treatment is significant.

The pre-treatment described above can be used with any fusion welding process, such as TIG, plasma arc, laser welding, etc., any of which are known to those skilled in this art. The pre-treatment is applicable to any process where localized heating beyond the solutionizing temperature of the alloy occurs, especially when high residual stresses, the magnitude of which are familiar to those skilled in this art, are generated during the welding process.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A pre-weld overageing heat treatment for nickel-based superalloys, comprising:

(a) heating a nickel-based superalloy to solutionization temperature for a period of time sufficient to dissolve a strengthening gamma prime phase of the microstructure of said nickel-based superalloy to produce a heated nickel-based superalloy;

(b) cooling said heated nickel-based superalloy at a rate of cooling that is slow enough to allow reprecipitation of said gamma prime phase as coarse particles; and (c) interrupting said cooling with intermittent heating cycles that cause at least a partial dissolution of gamma prime phase formed during the cooling, wherein said intermittent heating is at a rate or rates, and for a duration or durations, sufficient to obtain predominantly coarse equiaxed gamma prime precipitates in said microstructure.

2. The pre-weld overageing heat treatment according to claim 1, wherein said intermittent heating rate or rates is from 3° to 6° C./min.

3. The pre-weld overageing heat treatment according to claim 1, wherein said intermittent heating duration or durations is from 2 to 20 minutes.

4. The pre-weld overageing heat treatment according to claim 1, wherein said intermittent heating is conducted with a frequency of one heating cycle per 100° C. of temperature decrement during said cooling.

5. The pre-weld overageing heat treatment according to claim 1, further comprising:

(d) discontinuing said intermittent heating when the temperature of said heated nickel-based superalloy drops below about 500° C., and further cooling said material to near room temperature.

6. The pre-weld overageing heat treatment according to claim 5, wherein said further cooling comprises furnace cooling.

7. The pre-weld overageing heat treatment according to claim 1, wherein said nickel-based superalloy contains high volume fractions of gamma prime phase.

8. The pre-weld overageing heat treatment according to claim 1, wherein said nickel-based superalloy is Rene 80.

9. A process for welding a nickel-based superalloy, comprising:

(i) subjecting said nickel-based superalloy to the pre-weld overageing heat treatment according to claim 1; and (ii) welding said treated nickel-based superalloy obtained in (i).

10. The process for welding according to claim 9, wherein said welding (ii) comprises mass build-up.

11. The process for welding according to claim 9, wherein said welding (ii) comprises gouge-and-weld repair of thermal fatigue cracks.

12. The process for welding according to claim 9, wherein said welding (ii) comprises a welding process using localized heating beyond the solutionizing temperature of the alloy.

13. The process for welding according to claim 12, wherein said welding (ii) further comprises the generation of high residual stresses.

14. The process for welding according to claim 12, wherein said welding (ii) is TIG welding.

15. The process for welding according to claim 12, wherein said welding (ii) is plasma arc welding.

16. The process for welding according to claim 12, wherein said welding (ii) is laser welding.

* * * * *